(12) United States Patent
Fukuhara

(10) Patent No.: US 8,953,174 B2
(45) Date of Patent: Feb. 10, 2015

(54) DISPLACEMENT MEASURING APPARATUS AND APPARATUS THAT MEASURE RELATIVE DISPLACEMENT BETWEEN STRUCTURE AND SENSOR

(71) Applicant: Canon Kabushiki Kaisha, Tokyo (JP)

(72) Inventor: Takashi Fukuhara, Higashikurume (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/798,399

(22) Filed: Mar. 13, 2013

(65) Prior Publication Data

US 2013/0258352 A1 Oct. 3, 2013

(30) Foreign Application Priority Data

Mar. 19, 2012 (JP) .................................. 2012-061463

(51) Int. Cl.
*G01B 11/14* (2006.01)
*G01D 5/347* (2006.01)

(52) U.S. Cl.
CPC ............ *G01B 11/14* (2013.01); *G01D 5/34707* (2013.01)
USPC ........................................................ 356/614

(58) Field of Classification Search
CPC .......... G01B 11/026; G01S 5/163; G01S 5/16
USPC ................................................. 356/614, 445
See application file for complete search history.

(56) References Cited

U.S. PATENT DOCUMENTS

| 2005/0164435 A1* | 7/2005 | Park et al. ...................... 438/162 |
| 2008/0316493 A1* | 12/2008 | Maeda ............................ 356/445 |
| 2012/0075659 A1* | 3/2012 | Sawada et al. ................ 358/1.14 |
| 2012/0162852 A1* | 6/2012 | Cheng et al. ................. 361/301.4 |

FOREIGN PATENT DOCUMENTS

| JP | 2003-166855 A | 6/2003 |
| JP | 2010240956 A | * 10/2010 |

* cited by examiner

*Primary Examiner* — Tarifur Chowdhury
*Assistant Examiner* — M D Rahman
(74) *Attorney, Agent, or Firm* — Rossi, Kimms & McDowell LLP

(57) ABSTRACT

A displacement measuring apparatus includes a light source configured to illuminate light, and a photodetector provided on a structure and configured to detect reflected light from a reflection portion of a scale that alternately and periodically includes a convex portion scattering the light from the light source and the reflection portion reflecting the light, the displacement measuring apparatus measures a relative displacement between the structure and the photodetector based on a detection result from the photodetector, a length of the reflection portion in a period direction of the scale is greater than a half of a sum of lengths of the convex portion and the reflection portion, and the reflection portion includes a curved concave portion that reflects and collects the light illuminated from the light source.

10 Claims, 10 Drawing Sheets

DISPLACEMENT OF
REFLECTION PATTERN IMAGE

DISPLACEMENT OF STRUCTURE

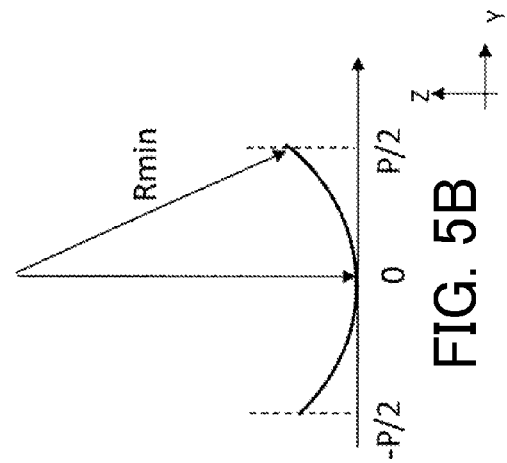
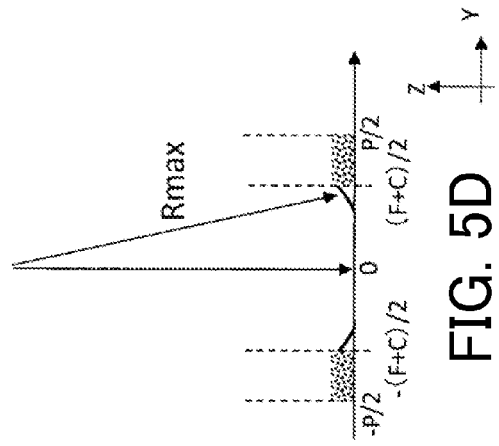
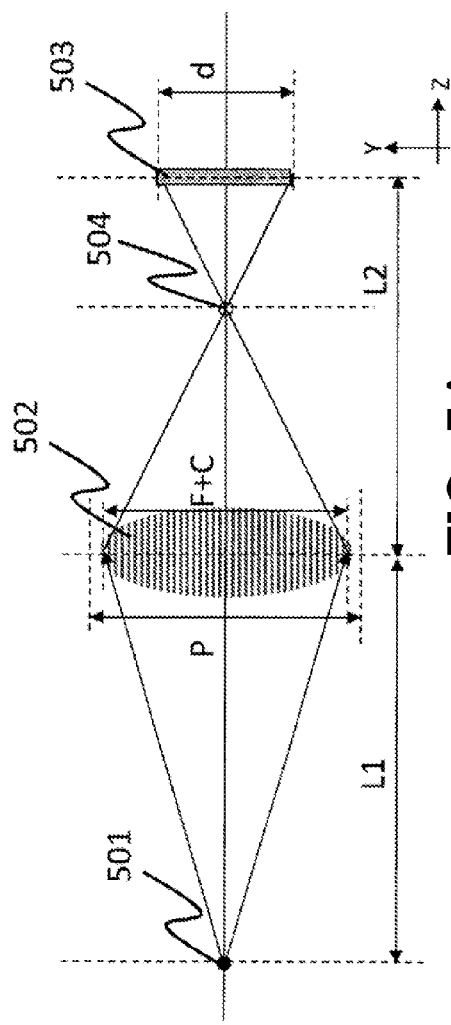
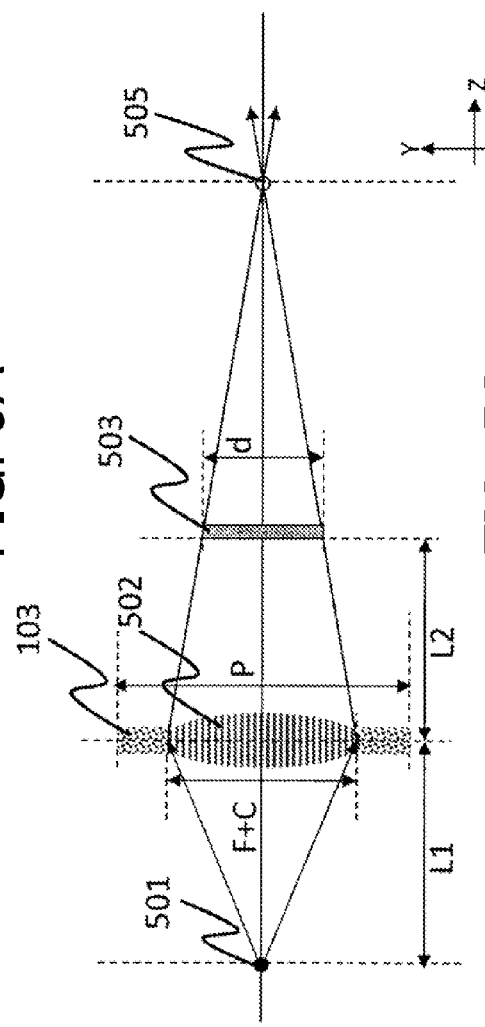

DISPLACEMENT MEASURING APPARATUS AND APPARATUS THAT MEASURE RELATIVE DISPLACEMENT BETWEEN STRUCTURE AND SENSOR

BACKGROUND OF THE INVENTION

1. Field of the Invention

The present invention relates to a displacement measuring apparatus that measures a relative displacement between a structure and a sensor.

2. Description of the Related Art

Previously, there has been a displacement measuring apparatus that illuminates light from a light source onto a surface of a structure so as to measure a displacement of the structure using a light beam reflected on the surface. The light beam reflected on the surface of the structure enters a light receiving element while generating a light intensity distribution in the reflected light beams in accordance with a surface roughness or a reflectance distribution of the structure. Since the light intensity distribution of the reflected light beams changes in accordance with the movement of the structure, the displacement of the structure can be measured by detecting the change of the light intensity distribution using the light receiving element. Japanese Patent Laid-Open No. 2003-166855 discloses a displacement measuring apparatus that is provided with a scale on the surface of the structure in which a reflectance is periodically changed in order to improve measurement accuracy of the displacement of the structure.

However, in the displacement measuring apparatus disclosed in Japanese Patent Laid-Open No. 2003-166855, when the reflectance of the surface of the structure is low, a signal amplitude that is detected by a sensor is lowered and therefore a signal-to-noise ratio (S/N) of the signal amplitude detected by the light receiving element is deteriorated. Accordingly, signal accuracy with respect to position information is lowered, and position detection accuracy is deteriorated. On the other hand, when an output of illumination light from the light source is increased in order to obtain reflected light intensity, a consumption of current of the light source is increased and a lifetime and a reliability of the light source are affected.

The signal amplitude detected by the sensor is maximized when a reflection surface and a scattering surface (non-reflection surface) have the same lengths each other in a period direction of the scale. Therefore, the length of the reflection surface cannot be wider than or equal to the same length as that of the scattering surface. In addition, a reflectance of the scale depends on a surface reflectance of the structure, and a material of the structure needs to be changed in order to obtain a desired reflectance. However, it is difficult to change the material since an original function of the structure may be lost by the change of the material.

SUMMARY OF THE INVENTION

The present invention provides a displacement measuring apparatus and an apparatus capable of performing a highly accurate measurement even when a reflectance of a structure is low.

A displacement measuring apparatus as one aspect of the present invention includes a light source configured to illuminate light, and a photodetector provided on a structure and configured to detect reflected light from a reflection portion of a scale that alternately and periodically includes a convex portion scattering the light from the light source and the reflection portion reflecting the light. The displacement measuring apparatus measures a relative displacement between the structure and the photodetector based on a detection result from the photodetector, a length of the reflection portion in a period direction of the scale is greater than a half of a sum of lengths of the convex portion and the reflection portion, and the reflection portion includes a curved concave portion that reflects and collects the light illuminated from the light source.

An apparatus as another aspect of the present invention includes a light source, a structure capable of being displaced, including a scale in which a convex portion scattering light from the light source and a reflection portion reflecting the light are alternately and periodically arranged, and a photodetector configured to detect reflected light from the reflection portion. A length of the reflection portion in a period direction of the scale is greater than a half of a sum of lengths of the convex portion and the reflection portion, and the reflection portion includes a curved concave portion that reflects and collects the light illuminated from the light source.

Further features and aspects of the present invention will become apparent from the following description of exemplary embodiments with reference to the attached drawings.

BRIEF DESCRIPTION OF THE DRAWINGS

FIGS. 5A to 5D are diagrams of illustrating an optical path of a light beam emitted from a light source and then reflected on the periodic structure scale as a reflection imaging system and a transmission imaging system in the displacement measuring apparatus of the present embodiment.

DESCRIPTION OF THE PREFERRED EMBODIMENTS

Figure 1:
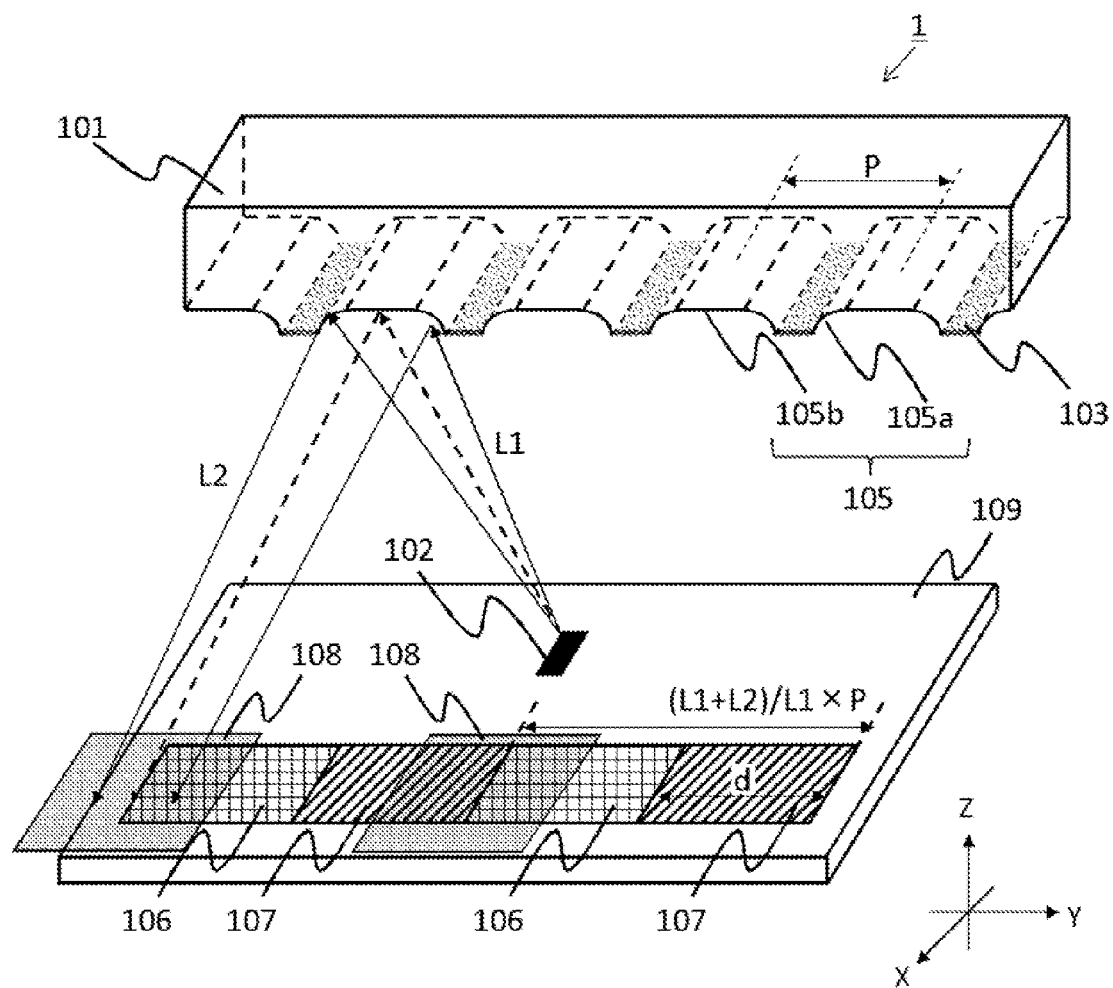
FIG. 1 is a configuration diagram of a displacement measuring apparatus in the present embodiment.

Exemplary embodiments of the present invention will be described below with reference to the accompanied drawings.

In each of the drawings, the same elements will be denoted by the same reference numerals and the duplicate descriptions thereof will be omitted.

First of all, referring to FIG. 1, an outline of a configuration of a displacement measuring apparatus in the present embodiment will be described. FIG. 1 is a configuration diagram of a displacement measuring apparatus 1. A structure 101 is configured to be capable of performing a relative displacement with respect to a sensor 109, and the displacement measuring apparatus 1 measures a displacement of the structure 101. A predetermined periodic structure scale (a scale) is provided on a surface of the structure 101. FIG. 1 illustrates a cross section (a YZ plane) of the periodic structure scale, and the periodic structure scale has a periodic structure described below in a Y-axis direction and has a continuous structure (the same structure) in an X-axis direction.

A light source 102 is mounted on the sensor 109, which illuminates light (divergent light beam) onto the periodic structure scale. The periodic structure scale alternately and periodically includes a convex portion (a portion that has a convex shape toward the light source or a photodetector) 103 that scattering the light from the light source 102 and a reflection portion 105 that reflects the light. The convex portion 103 is a scattering portion that scatters the light illuminated from the light source 102. In the present embodiment, the reflection portion 105 includes a curved concave portion (a portion that has a concave shape toward the light source or the photodetector) 105a and a plane portion 105b. The curved concave portion 105a is formed at each of both ends of the plane portion 105b in a period direction of the periodic structure scale. The curved concave portion 105a is configured so as to reflect and then collect the light illuminated from the light source 102. The plane portion 105b is configured so that the light from the light source 102 is regularly reflected. The reflection portion 105 is configured by the plane portion and the two concave portions, each of which has a concave surface as a surface at the side of the photodetector, provided at both ends (in the period direction) of the plane portion, but the embodiment is not limited to this. For example, the concave portion may also be configured so that a whole of the reflection portion 105 has a curved shape. This curved shape may be a curved surface having a constant curvature, or alternatively it may be configured so that a radius of curvature is decreased toward both the ends of this reflection portion. The reflection portion 105 may also be configured to have a concave shape toward the photodetector (toward the light source) also in a direction (the X direction) perpendicular to the period direction.

In the present embodiment, a length of the reflection portion 105 in the period direction (the Y-axis direction) of the scale, i.e. a sum of lengths in the Y-axis direction of the curved concave portion 105a and the plane portion 105b is greater than ½ (half) of a sum of lengths in the Y-axis direction (one period) of the convex portion 103 and the reflection portion 105. It is more preferred that the sum of the lengths in the Y-axis direction of the curved concave portion and the plane portion be greater than ⅔ of the sum of the lengths in the Y-axis direction (one period) of the convex portion and the reflection portion. In order to improve an S/N ratio on the photodetector, it is preferred that the sum of the lengths in the Y-axis direction of the curved concave portion and the plane portion be greater than 9/10 of the sum of the lengths in the Y-axis direction (one period) of the convex portion and the reflection portion.

Each of photodiode arrays 106 and 107 mounted on the sensor 109 is the photodetector (a light receiving element) that detects reflected light from the reflection portion 105 of the periodic structure scale. The reflected light is regularly reflected on the plane portion 105b for a light beam illuminated on the periodic structure scale and then reflected and collected by the curved concave portion 105a to be formed. Each reflected light is overlapped with each other on the photodiode arrays 106 and 107, and thus a reflection pattern image 108 can be obtained. The light beam entering the convex portion 103 (the scattering portion) is scattered, and therefore it does not contribute to the formation of the reflection pattern image 108. This convex portion is positioned at the side of the photodetector (or the light source) compared to the reflection portion (the concave portion) described above, and the shape of the convex shape may be a plane or alternatively may have a convex shape toward the photodetector.

The reflection pattern image 108 moves in accordance with the displacement of the structure 101, and a relation of displacements between the structure 101 and the reflection pattern image 108 is represented by the following Expression (1).

$$X2 = \frac{L1 + L2}{L1} \times X1 \tag{1}$$

In Expression (1), symbol L1 denotes an optical path length from the light source 102 to a light reflection position on the periodic structure scale, symbol L2 denotes an optical path length from the light reflection position to a light incident position on the photodiode arrays 106 and 107 (the light receiving elements). Symbol X1 denotes a displacement of the structure 101, and symbol X2 denotes a displacement of the reflection pattern image 108.

When a period of the periodic structure scale is P, the photodiode array 106 (the light receiving element) is disposed so that a width (a length) in the Y-axis direction (the period direction) is d and a gap is (L1+L2)/L1×P. The photodiode array 107 has the same configuration as that of the photodiode array 106, which is disposed so as to be spatially shifted by a half period of the photodiode array 106 in the Y-axis direction, i.e. shifted by (L1+L2)/2/L1×P.

Figure 2A:
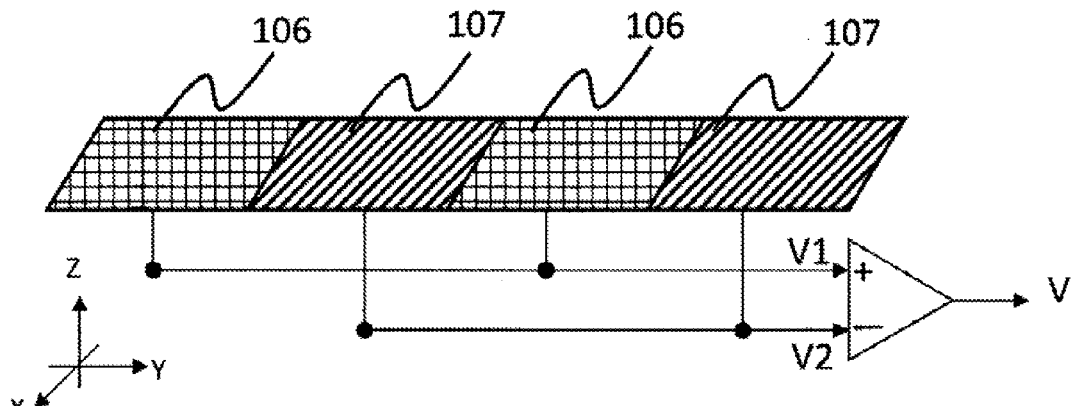
FIGS. 2A to 2C are diagrams of describing a method of detecting a displacement of a structure using the displacement measuring apparatus of the present embodiment.
Figure 2B:
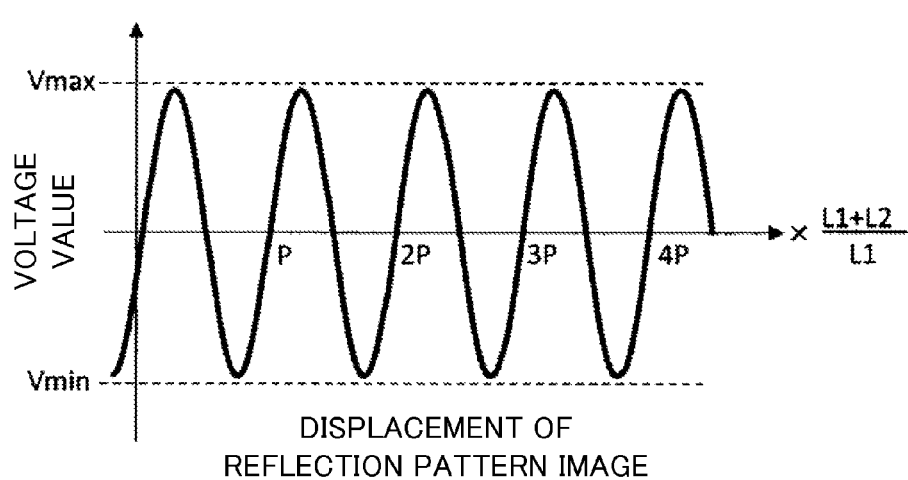
Figure 2C:
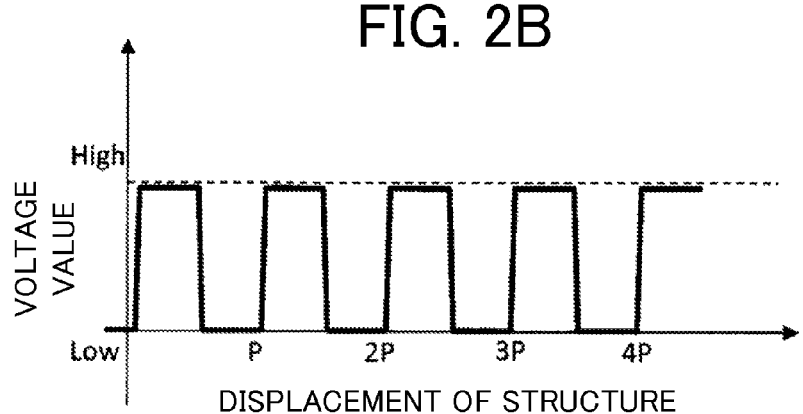

Next, referring to FIGS. 2A to 2C, a method of detecting the displacement of the structure 101 using the displacement measuring apparatus 1 will be described. FIGS. 2A to 2C are diagrams of describing the method of detecting the displacement of the structure 101 using the displacement measuring apparatus 1. First of all, a voltage value that is detected by the photodiode arrays 106 and 107 will be described. FIG. 2A is a diagram of describing a method of detecting a voltage value V using the photodiode arrays 106 and 107. A photoelectric conversion is performed for the reflection pattern image 108 generated on the photodiode arrays 106 and 107 using each of the photodiode arrays 106 and 107.

In the present embodiment, a detected voltage value V1 of the photodiode array 106 is determined based on a sum of detected voltage values of a plurality of photodiodes that constitute the photodiode array 106. Similarly, a detected voltage value V2 of the photodiode array 107 is determined based on a sum of detected voltage values of a plurality of photodiodes that constitute the photodiode array 107. Then, the displacement measuring apparatus 1, as represented by the following Expression (2), outputs the detected voltage value V at a predetermined time at which an intensity distribution of the reflection pattern image 108 in the Y-axis direction is reflected based on a differential voltage value of both the photodiode arrays.

$$V = V1 - V2 \tag{2}$$

Next, a change of a signal that is detected in accordance with the displacement of the structure 101 will be described. FIG. 2B is a diagram of a relation between the displacement of the reflection pattern image 108 that moves in accordance with the displacement of the structure 101 and the detected voltage value V that is detected by the photodiode arrays 106 and 107. The reflection pattern image 108 moves on the photodiode array 106 and 107 with the movement of the structure 101. In this case, the detected voltage value V1 of the photodiode array 106 is maximized in a state where a center of each reflection pattern image 108 is overlapped at a center position of each photodiode constituting the photodiode array 106. On the contrary, the detected voltage value V2 of the photodiode array 107 that is spatially shifted by (L1+L2)/2/L1×P is minimized. Therefore, the detected voltage value V (=V1−V2) indicates a maximum value Vmax.

In addition, when the center of each reflection pattern image 108 is moved to the center of each photodiode constituting the photodiode array 107 along with the movement of the structure 101, the detected voltage value V1 of the photodiode array 106 is minimized. On the contrary, the detected voltage value V2 of the photodiode array 107 is maximized. Therefore, the detected voltage value V indicates a minimum value Vmin. Thus, the detected voltage value V by the photodiode arrays 106 and 107 is obtained as a sine-wave signal that repeats the maximum value Vmax and the minimum value Vmin for each displacement (L1+L2)/2/L1×P of the reflection pattern image 108.

Next, a method of obtaining the displacement of the structure 101 using an output signal from the sensor 109 based on the detected voltage value V that is detected in accordance with the displacement of the structure 101 will be described. FIG. 2C is a diagram of illustrating a pulse signal (a voltage value) that is outputted from the sensor 109 based on the detected voltage value V of the photodiode arrays 106 and 107. The sensor 109 outputs a pulse signal of a high level when a relation between the obtained detected voltage value V and a center of voltage values Vc that is represented by the following Expression (3) satisfies V≥Vc. On the other hand, the sensor 109 outputs a pulse signal of a low level when V<Vc is satisfied.

$$Vc = \frac{V\max + V\min}{2} \qquad (3)$$

In the embodiment, the displacement of the reflection pattern image 108 along with the displacement corresponding to the period P of the periodic structure scale of the structure 101 is (L1+L2)/L1×P. This is equal to an array period of each photodiode array. Therefore, the detected voltage value V that is obtained while the structure 101 is displaced by the period P is a one-period sine-wave signal having the center of voltage values Vc, and in this case the sensor 109 outputs a one-period pulse. The displacement of the structure 101 can be calculated based on a product of the number of pulses that the sensor 109 outputs and the period P of the periodic structure scale on a surface of the structure 101.

Figure 3A:
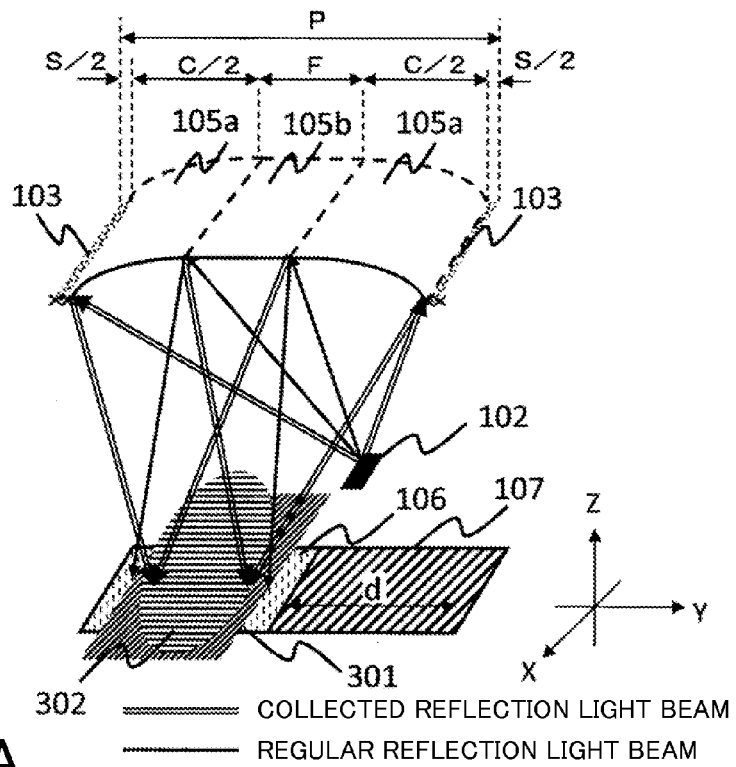
FIGS. 3A and 3B are diagrams of illustrating a behavior of reflected light from a periodic structure scale in the displacement measuring apparatus of the present embodiment.
Figure 3B:
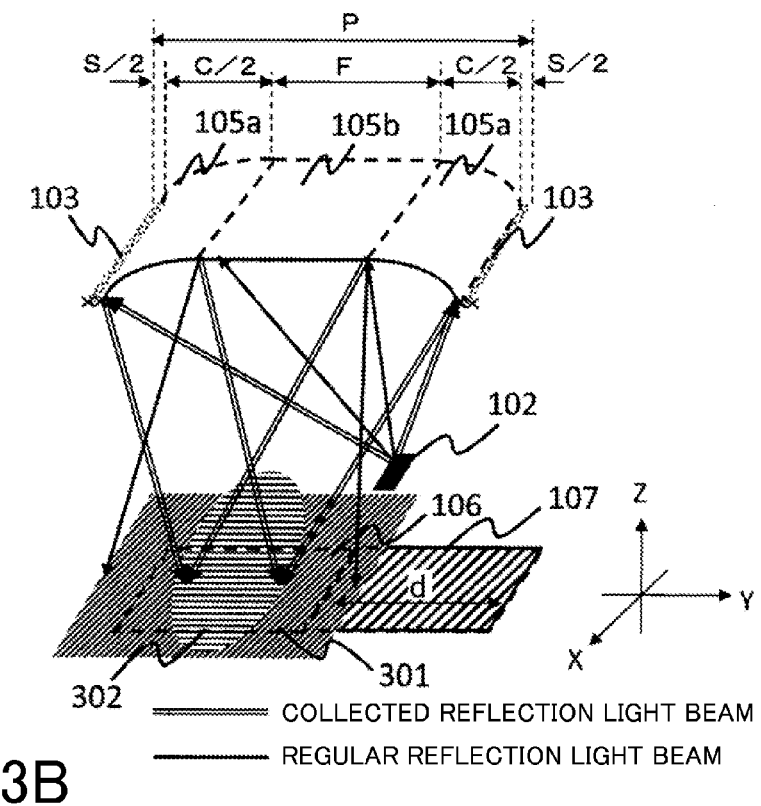

Next, referring to FIGS. 3A and 3B, a condition of the lengths of the curved concave portion 105a, the plane portion 105b, and the convex portion 103 (the scattering portion) that constitute the periodic structure scale of the present embodiment, i.e. a condition in which the reflected light can be effectively used as a detection signal, will be described. FIGS. 3A and 3B are diagrams of illustrating a behavior of the reflected light from the periodic structure scale.

First of all, when the scale is configured only by the plane portion 105b, a length F of the plane portion 105b in the Y-axis direction by which the reflected light can be most effectively used is a case in which the lengths of the reflected portion 105 and the convex portion 103 are equal to each other. In other words, it is a case in which the following Expression (4) is satisfied.

$$F = \frac{L1}{L1 + L2} \times d \qquad (4)$$

FIG. 3A is a cross-sectional diagram of illustrating a case in which reflected light beams from the curved concave portion 105a and the plane portion 105b (the reflection portion 105) enter the same photodiode within one period of the periodic structure scale in the present embodiment. First of all, when the length F of the plane portion 105b in one period is less than the value of Expression (4), a width of a regular reflection image 301 on the photodiode array 106 (the light receiving element) of the light beam (the regular reflection light beam) that is regularly reflected on the plane portion 105b is represented as the following Expression (5).

$$\frac{L1 + L2}{L1} \times F \le d \qquad (5)$$

A light beam reflected and collected by the curved concave portion 105a (a collected reflection light beam) is regularly reflected by the plane portion 105b within the same period and then collected at substantially a center position of the regular reflection image 301 that is generated on the photodiode array 106. In this case, the collected reflection light beam is collected as a collected reflection image 302 with not more than a width d of the photodiode array 106. Thus, the light beam regularly reflected by the plane portion 105b (the regularly reflected light beam) and the light beam reflected and collected by the curved concave portion 105a (the collected reflection light beam) are overlapped on the photodiode array 106, and it forms the reflection pattern image 108 that has a width less than or equal to the width d. In this case, in the one period, in order to obtain a reflection area that is larger than or equal to a common amplitude grating scale that includes a reflection region and a non-reflection region (a scattering region) having the same length, the length of the convex portion 103 in the Y-axis direction needs to be set to be shorter than or equal to a half of the length of the periodic structure scale, and a remaining region needs to be the curved concave portion 105a. In other words, the periodic structure scale is set to satisfy relations of the following Expressions (6), (7), and (8).

$$0 < F \le \frac{L1}{L1 + L2} \times d \qquad (6)$$

$$\frac{P}{2} < F + C < P \qquad (7)$$

$$0 < S < \frac{P}{2} \qquad (8)$$

In Expressions (7) and (8), symbol C denotes a length of the curved concave portion 105a, symbol S denotes a length of the convex portion 103, and symbol P denotes a length per one period of the periodic structure scale. When the conditions of Expressions (6), (7), and (8) described above are satisfied, the collected reflection light beam is utilized compared to the common amplitude grating scale configured only by the plane portion 105b, and it can be effectively utilized as a detection signal.

Subsequently, a case in which the length F of the plane portion 105b in the one period is larger than the value of Expression (4) will be described. In other words, a condition of obtaining a good signal for a common amplitude grating scale even when the regular reflection image 301 is wider than the width d of the photodiode and the detected voltage value V is lowered as a result of always satisfying V1>0 and V2>0 will be described. FIG. 3B is a cross-sectional diagram of illustrating the behavior of the reflected light beam from the periodic structure scale when the width of the regular reflection image 301 on the photodiode arrays 106 and 107 is greater than or equal to d. As to the plane portion 105b, a length of a component of the plane portion 105b that generates the regular reflection image 301 entering a range within the width d of the photodiode is $d \times L1/(L1+L2)$. As to the plane portion 105b, a length of a component of the plane portion 105b that generates the regular reflection image 301 that is leaked onto an adjacent photodiode to lower a signal amplitude is $F - d \times L1/(L1+L2)$.

If the light beam which is larger than or equal to the regular reflection image 301 contributing to the decrease of the signal amplitude is collected within the range of the width d of the photodiode as the collected reflection image 302 by the curved concave portion 105a, a signal amplitude better than that of the common amplitude grating scale can be obtained. In other words, the length C of the curved concave portion 105a in the Y-axis direction only needs to be longer than the length $F - d \times L1/(L1+L2)$ of the plane portion 105b that contributes to the leakage to the adjacent photodiode. As a result, the curved concave portion 105a and the plane portion 105b (the reflection portion) need to be configured so as to satisfy the following Expression (9).

$$F - \frac{L1}{L1 + L2} \times d < C \quad (9)$$

The relation between the length F of the plane portion 105b and the length C of the curved concave portion 105a has to be satisfied with a range (P-S) that is obtained by subtracting the length S of the convex portion 103 generated within the one period. Since F+C+S=P is satisfied, the following Expression (10) is introduced.

$$F < \frac{P - S}{2} + \frac{L1}{L1 + L2} \times \frac{d}{2} \quad (10)$$

Thus, organizing the conditions depending on the length F of the plane portion 105b described with reference to FIGS. 3A and 3B, conditions in which the reflected light intensity and the signal amplitude are increased compared to a conventional periodic structure scale are represented by the following Expressions (11), (12), and (13).

$$\frac{P}{2} < F + C < P \quad (11)$$

$$0 < S < \frac{P}{2} \quad (12)$$

$$0 < F < \frac{P - S}{2} + \frac{d}{2} \times \frac{L1}{L1 + L2} \quad (13)$$

Figure 4A:
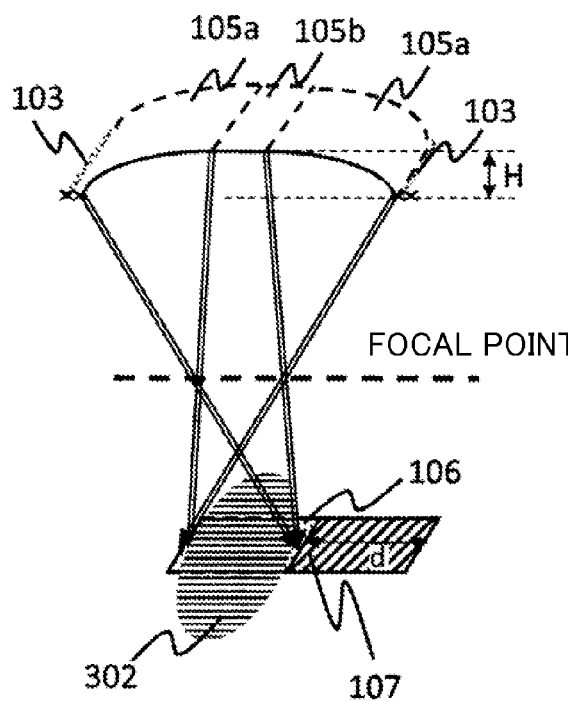
FIGS. 4A and 4B are diagrams of describing a condition of a height of a convex portion in the displacement measuring apparatus of the present embodiment.
Figure 4B:
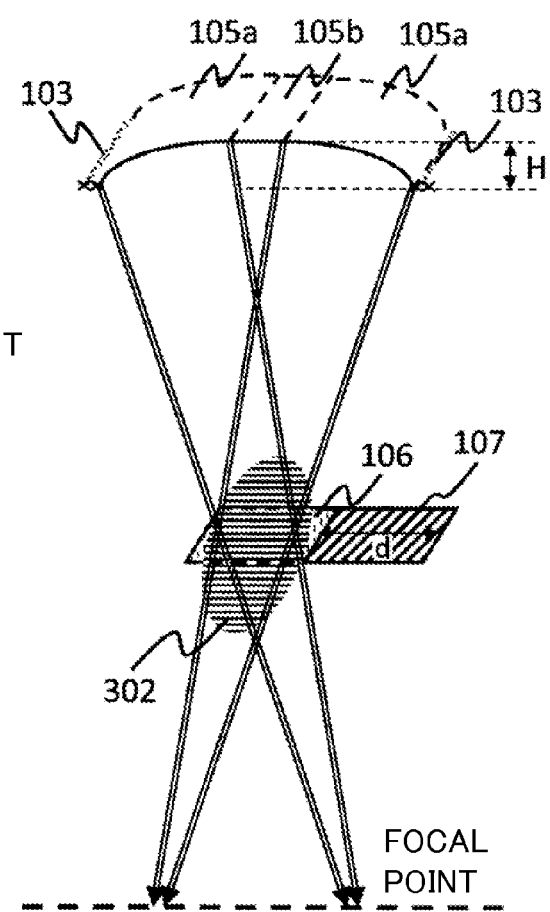

Next, referring to FIGS. 4A and 4B, as to the periodic structure scale of the displacement measuring apparatus 1, a condition of a height H of the convex portion 103 (a gap in a Z-axis direction between the plane portion 105 and the convex portion 103) that is required for the collected reflection image 302 from the curved concave portion 105a to be reduced to less than or equal to the width d on the photodiode will be described. FIGS. 4A and 4B are diagrams of describing the condition of the height of the convex portion 103 (the scattering portion) in the displacement measuring apparatus 1.

A method of manufacturing the periodic structure scale will be described below, but anyway, it is difficult to exactly control and form the shape of the curved concave portion 105a. Therefore, in the present embodiment, using the height H of the convex portion 103 as a parameter, the shape of the curved concave portion 105a can be controlled. The height H of the convex portion 103 is replaced as a height H of the curved concave portion 105a, which is assumed to be a height that is obtained when the curved concave portion 105a has an ideal curved surface. The height H of the curved concave portion 105a is, for the length C of the same curved concave portion 105a, lowered as the radius of curvature of the curved concave portion 105a is increased. On the contrary, it gets higher as the radius of curvature of the curved concave portion 105a is decreased. In addition, the height H of the curved concave portion 105a depends on the length C of the curved concave portion 105a. In other words, the height H of the curved concave portion 105a gets higher when the length C of the curved concave portion 105a is long, and on the other hand, the height H of the curved concave portion 105a is lowered when the length C of the curved concave portion 105a is short.

On the bases of the above descriptions, a condition in which the height H of the convex portion 103 indicates a maximum value Hmax will be described. FIG. 4A a cross-sectional diagram of the periodic structure scale that illustrates a situation where the light beam reflected and collected by the curved concave portion 105a is focused and then enters the photodiode array 106 as the collected reflection image 302 having the width d. In this case, the radius of curvature of the curved concave portion 105a is smaller than an ideal radius of curvature R that is focused on the photodiode array 106. When the length C of the curved concave portion 105a is equal (substantially equal) to one period of the periodic structure scale, the height of the curved concave portion 105a, i.e. the height H of the convex portion 103 indicates the maximum value Hmax.

Subsequently, a condition in which the height H of the convex portion 103 indicates a minimum value Hmin will be described. FIG. 4B is a cross-sectional diagram of the periodic structure scale that illustrates a situation where the light beam reflected and collected by the curved concave portion 105a enters the photodiode array 106 as the collected reflection image 302 having the width d before the light beam is focused. In this case, the radius of curvature of the curved concave portion 105a is larger than the ideal radius of curvature R that is focused on the photodiode array 106. When the convex portion 103 has a width nearly equal to P/2 and the curved concave portion 105a and the plane portion 105b satisfy the following Expressions (14) and (15) in accordance with Expressions (8) and (9), the length C of the curved concave portion 105a is minimized.

$$F = \frac{P}{4} + \frac{L1}{L1+L2} \times \frac{d}{2} \quad (14)$$

$$C = \frac{P}{4} - \frac{L1}{L1+L2} \times \frac{d}{2} \quad (15)$$

In this case, the height of the curved concave portion 105a, i.e. the height H of the convex portion 103 indicates the minimum value Hmin.

When the height of the curved concave portion 105a is between the minimum value Hmin and the maximum value Hmax, a position on which collected reflection light from the curved concave portion 105a focuses is between focus positions indicated by FIGS. 4A and 4B. The width of the collected reflection image 302 on the photodiode array 106 is less than or equal to the width d of the photodiode array 106. Accordingly, a condition of the height H of the convex portion 103 in the Z-axis direction is represented as the following Expression (16).

$$H_{min} \leq H < H_{max} \quad (16)$$

Next, referring to FIGS. 5A to 5D, a method of deriving the maximum value Hmax and the minimum value Hmin of the height H of the convex portion 103 of the periodic structure scale in the displacement measuring apparatus 1 will be described. FIGS. 5A to 5D are diagrams of illustrating an optical path of a light beam that is emitted from the light source and reflected by the periodic structure scale as a reflection imaging system and a transmission imaging system.

First of all, the derivation of the maximum value Hmax of the height H of the convex portion 103 will be described. FIG. 5A is a transmission-type thin-wall lens model in which the reflection imaging system is replaced with the transmission imaging system with respect to a cross section of the periodic structure scale in the displacement measuring apparatus 1 in a state where the height H of the convex portion 103 indicates the maximum value Hmax. In FIG. 5A, a lens is illustrated so as to have a predetermined thickness, but the thickness is assumed to be zero in the embodiment.

The light beam emitted from an artificial light source 501 (a light source) is collected by a lens 502 that corresponds to the curved concave portion 105a to focus on an intermediate position 504 and enters a surface of an artificial photodiode 503. Considering the configuration of FIG. 5A by overlapping with the configuration of the displacement measuring apparatus 1 illustrated in FIG. 1, the calculation is performed by using the same parameter. When a focal length of the lens 502 corresponding to the curved concave portion 105a is f, a radius of curvature Rmin of the lens 502 is represented as the following Expression (17).

$$R_{min} = 2 \times f = \frac{2 \times L1 \times L2 \times P}{P \times L2 + (d+P) \times L1} \quad (17)$$

FIG. 5B is a cross-sectional diagram of the periodic structure scale when the curved concave portion 105a has the radius of curvature Rmin in a YZ plane. A difference between a value of a Z-coordinate at a position of zero on the Y-axis and a value of the Z-coordinate of a curved surface at a position of P/2 on the Y-axis indicates the maximum value Hmax of the height H of the convex portion 103 that is to be obtained. The maximum value Hmax is represented as the following Expression (18) using the formula of a circle.

$$H_{max} = \frac{2 \times L1 \times L2 \times P}{P \times L2 + (d+P) \times L1} - \sqrt{-\left(\frac{P}{2}\right)^2 + \left(\frac{2 \times L1 \times L2 \times P}{P \times L2 + (d+P) \times L1}\right)^2} \quad (18)$$

Next, a derivation of the minimum value Hmin of the height H of the convex portion 103 will be described. FIG. 5C is, similarly to FIG. 5A, a transmission-type thin-wall lens model in which the reflection imaging system is replaced with the transmission imaging system with respect to a cross section of the periodic structure scale in the displacement measuring apparatus 1 in a state where the height H of the convex portion 103 indicates the minimum value Hmin. In FIG. 5C, similarly to FIG. 5A, a lens is illustrated so as to have a predetermined thickness, but the thickness is assumed to be zero in the embodiment.

The light beam emitted from the artificial light source 501 is collected by the lens 502 corresponding to the curved concave portion 105a to transmit through the surface of the artificial photodiode 503, and focuses on a position 505 behind the artificial photodiode. Since the convex portion 103 as a scattering portion exists, the diameter of the lens is F+C. Using the formula of the lens, the radius of curvature Rmax of the lens 502 in this case is represented as the following Expression (19).

$$R_{max} = 2 \times f = \frac{2 \times L1 \times L2 \times (F+C)}{(F+C) \times L2 + (F+C-d) \times L1} \quad (19)$$

FIG. 5D is a cross-sectional diagram of the periodic structure scale when the curved concave portion 105a has the radius of curvature Rmax in the YZ plane. A difference between a value of the Z-coordinate at a position of F/2 on the Y-axis and a value of the Z-coordinate at a position of (F+C)/2 on the Y-axis indicates the minimum value Hmin of the height H of the convex portion 103 that is to be obtained. The minimum value Hmin is calculated using the following Expression (20).

$$H_{min} = \sqrt{-\left(\frac{F}{2}\right)^2 + \left(\frac{2 \times L1 \times L2 \times (F+C)}{(F+C) \times L2 + (F+C-d) \times L1}\right)^2} - \sqrt{-\left(\frac{F+C}{2}\right)^2 + \left(\frac{2 \times L1 \times L2 \times (F+C)}{(F+C) \times L2 + (F+C-d) \times L1}\right)^2} \quad (20)$$

Setting the height H of the convex portion 103 to be a range from the minimum value Hmin to the maximum value Hmax, the curved concave portion 105a having a radius of curvature that has a focus within a permissible focus error of the curved concave portion 105a is formed. Most of the light beams reflected on the reflection portion region of the periodic structure scale enter the same photodiode.

It is preferred that the curved concave portion 105a have a curved surface including a radius of curvature R that satisfies the following Expression (21) in which a surface of the photodiode is the focus position.

$$R = \frac{2 \times L1 \times L2}{L1 + L2} \quad (21)$$

According to this, a reflecting and collecting action by the curved concave portion with respect to the photodiode that the regular reflection light enters is strengthened, and an overlapped intensity of the reflected light beams is strengthened. As a result, the signal amplitude to be detected is increased, and position detection accuracy is improved.

In the present embodiment, the light source 102 and the photodiode arrays 106 and 107 are mounted on the sensor 109 so that a light emitting surface of the light source 102 and a surface of the photodiode array (a surface of the light receiving element) are disposed in the same plane. A distance between this plane (the same plane) and the periodic structure scale of the structure 101 is L1=L2=2 mm. A relation between the width d of the photodiode array and the period P of the periodic structure scale is P=d=0.128 mm. According to this, a ratio of movements of the structure 101 and the reflection pattern image 108 is 1:2, and conditions in which the reflected light intensity and the signal amplitude are increased compared to the conventional periodic structure scale are represented by the following Expressions (22), (23), and (24).

$$0 < F + C < 0.128 \text{ [mm]} \quad (22)$$

$$0 < S < 0.064 \text{ [mm]} \quad (23)$$

$$0 < F \le -\frac{S}{2} + 0.096 \text{ [mm]} \quad (24)$$

A range that can be available for the height H of the convex portion 103 on the periodic structure scale is obtained as the following Expression (25). In this case, it is preferred that the curved concave portion 105a be a curved surface including a radius of curvature R=2 mm.

$$-\sqrt{-\left(\frac{F}{2}\right)^2 + \left(\frac{2 \times (F+C)}{(F+C-0.064)}\right)^2} + \sqrt{-\left(\frac{F+C}{2}\right)^2 + \left(\frac{2 \times (F+C)}{(F+C-0.064)}\right)^2} \le H < 0.001535116 \text{ [mm]} \quad (25)$$

Figure 6A:
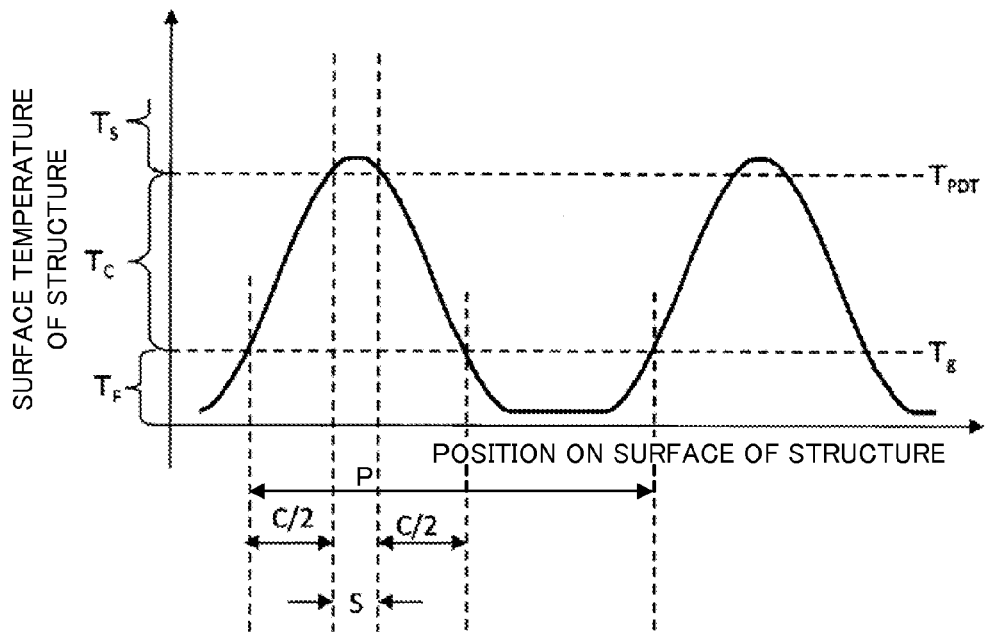
FIGS. 6A and 6B are diagrams of illustrating a relation between a temperature distribution on a surface of the structure and a shape that is to be formed in the displacement measuring apparatus of the present embodiment.
Figure 6B:
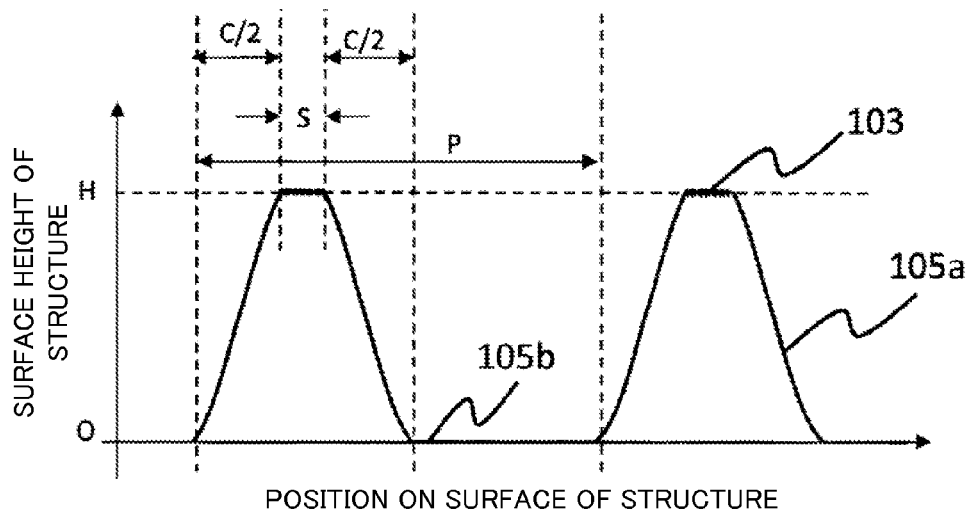

Next, referring to FIGS. 6A and 6B, a method of processing the periodic structure scale will be described. FIGS. 6A and 6B are diagrams of illustrating a relation between a temperature distribution on a surface of the structure 101 and a shape to be formed. In the present embodiment, the surface of the structure 101 on which the periodic structure scale is formed is made of a polymer material that causes a phenomenon depending on the temperature such as a glass transition or a thermal decomposition (sublimation). As the polymer material, for example polyimide is used. In the present embodiment, for example, the periodic structure scale is processed by a thermal process using a laser.

First of all, the temperature distribution on the surface of the structure 101 and a region where the physical phenomenon with respect to the temperature is caused will be described. FIG. 6A is a diagram of illustrating the temperature distribution on the surface of the structure 101 when the periodic structure scale is formed. In FIG. 6A, symbol T denotes a surface temperature of the structure 101, symbol Tg denotes a Glass transition point of a material of the structure 101 that is an object to be processed, and symbol $T_{PDT}$ denotes a thermal decomposition starting time. In accordance with the surface temperature T of the structure 101, a region is divided into three regions of a region $T_F$ where T<Tg is satisfied, a region $T_C$ where Tg<T<$T_{PDT}$ is satisfied, and a region $T_S$ where $T_{PDT}$<T is satisfied. As illustrated in FIG. 6A, the region of the surface temperature distribution of the structure 101 is sequentially changed as $T_F$, $T_C$, $T_S$, $T_C$, and $T_F$ in this order in one period of the periodic structure scale.

Next, a relation between the surface temperature of the structure 101 and the shape that is to be formed will be described. FIG. 6B is a diagram of illustrating the shape that is to be formed on the surface of the structure 101 in accordance with the surface temperature. When the surface temperature T of the structure 101 is within the region $T_F$, the reaction does not occur. This part corresponds to the plane portion 105b in the periodic structure scale, and the length of the region $T_F$ in the Y-axis direction corresponds to the length F of the plane portion 105b. When the surface temperature of the structure 101 is within the region $T_S$, the thermal decomposition (the sublimation) occurs and the surface in the region $T_S$ has a shape like an exploded shape. The region $T_S$ is the scattering portion (the convex portion 103) in the periodic structure scale, and the length of the region $T_S$ in the Y-axis direction corresponds to the length S of the convex portion 103.

When the surface temperature T is within the region $T_C$, the shape can be easily deformed by receiving an external force since fluidity appears on the surface of the structure 101. In this case, any deformation does not occur in the region $T_F$ that is at one end of the region $T_C$, and on the other hand, the burst of the surface occurs by the sublimation in the region $T_S$ that is at the other end of the region $T_C$. Thus, since the deformation of the shape at one end is restricted while the other end is raised by the sublimation in the Z-axis direction, a gently curved surface shape is formed in the region $T_C$. The region $T_C$ corresponds to the curved concave portion 105a in the periodic structure scale, and the length of the region $T_C$ in the Y-axis direction corresponds to the length C of the curved concave portion 105a. The height H of the convex portion 103 can be controlled by changing the distribution of a thermal energy that is to be given. Thus, a radius of curvature having a desired range for the curved concave portion 105a can be obtained.

Figure 7A:
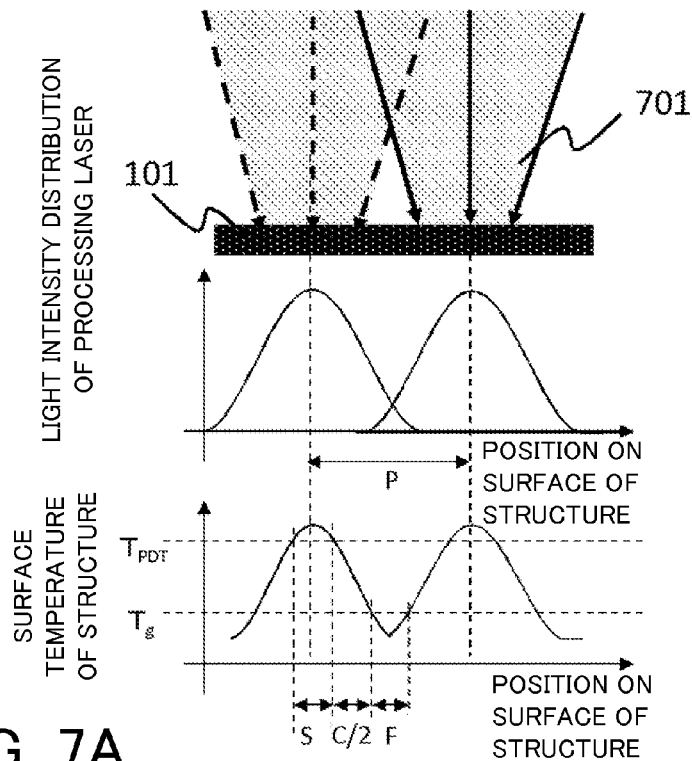
FIGS. 7A and 7B are diagrams of illustrating a light intensity distribution of a processing laser and a thermal distribution of a laser illumination position on a surface of the structure in the displacement measuring apparatus in the present embodiment.
Figure 7B:
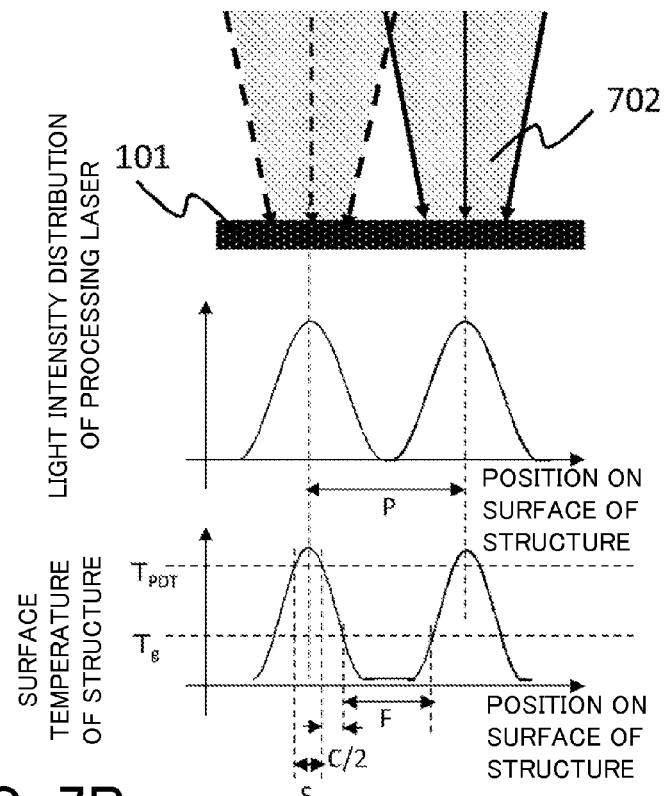

Next, referring to FIGS. 7A and 7B, a specific method of processing the periodic structure scale onto the surface of the structure 101 will be described. In the embodiment, a specific example of the light intensity distribution of a processing laser 701 that is illuminated onto the structure 101 and the shape that is formed on the surface of the structure 101 will be described. FIGS. 7A and 7B are diagrams of illustrating the light intensity distribution of the processing laser and the thermal distribution of a laser illumination position on the surface of the structure. FIG. 7A illustrates a case where the polyimide surface of the structure 101 is processed by the processing laser 701 having a spot size of φ0.093 mm. FIG. 7B illustrates a case where the polyimide surface of the structure 101 is processed by a processing laser 702 having a spot size of φ0.06 mm. Depending on the intensity distribution of the processing laser 701, the surface of the structure 101 is divided into a region having a temperature that is higher or equal to the Glass transition point and a region having a temperature that is higher or equal to the thermal decomposition temperature. As described above, in the region where the temperature is higher than or equal to the Glass transition point, the fluid region is the curved concave portion 105a. In the region where the temperature is higher or equal to the thermal decomposition temperature, the scattering occurs by the sublimation and the convex portion 103 is obtained as the scattering portion, and thus the convex portion shape is formed. The remaining region is the plane portion 105b.

With respect to the other processing conditions in FIG. 7A, a processing laser output of 1.3 W, a laser scanning velocity of 1000 mm/s, a scale period P of 0.128 mm (P=0.128 mm), F=0.03 mm, C=0.047 mm, S=0.051 mm, and a signal amplitude of 744 mV are satisfied. In this case, the range that is available for the height H of the convex portion 103 is 0.000053 mm<H<0.001535 mm, and an experimental result is H=0.00035 mm. With respect to the other processing conditions in FIG. 7B, the processing laser output of 0.5 W, the laser scanning velocity of 1000 mm/s, the scale period P of 0.128 mm (P=0.128 mm), F=0.06 mm, C=0.043 mm, S=0.025 mm, and the signal amplitude of 924 mV are satisfied. In this case, the range that is available for the height H of the convex portion 103 is 0.000166<H<0.001535 mm, and the experimental result is H=0.00035 mm. In both cases, Expressions (19) to (22) that are conditions described above are satisfied. In addition, the signal amplitude obtained from the periodic structure scale is sufficient, and therefore a shape that is suitably used to perform a highly-accurate displacement measurement can be obtained.

Furthermore, referring to FIGS. 7A and 7B, it is found that the length S of the convex portion 103 (the length of the region $T_S$ in the Y-axis direction) increases depending on a spot size of the processing laser (a beam diameter of the laser). The region $T_S$ (a region of the scattering portion) needs to have a size of lower than or equal to a half (½) of the period P of the periodic structure scale. Therefore, similarly, setting the spot size (the beam diameter) of the processing laser to be lower than or equal to a half (½) of the period P of the periodic structure scale, an unnecessary region of the scattering portion is not generated.

In the present embodiment, in both the conditions illustrated in FIGS. 7A and 7B, the conditions of the height H of the convex portion 103, the length F of the plane portion 105b, the length C of the curved concave portion 105a, and the length S of the convex portion 103 are satisfied. In this regard, considering an effective reflection area and a superiority of the signal amplitude, the condition illustrated in FIG. 7B is more preferred. In the present embodiment, the case where the structure is displaced, but alternatively the sensor or both the sensor and the structure may be displaced to be able to detect the relative displacement by the principle described above.

Figure 8:
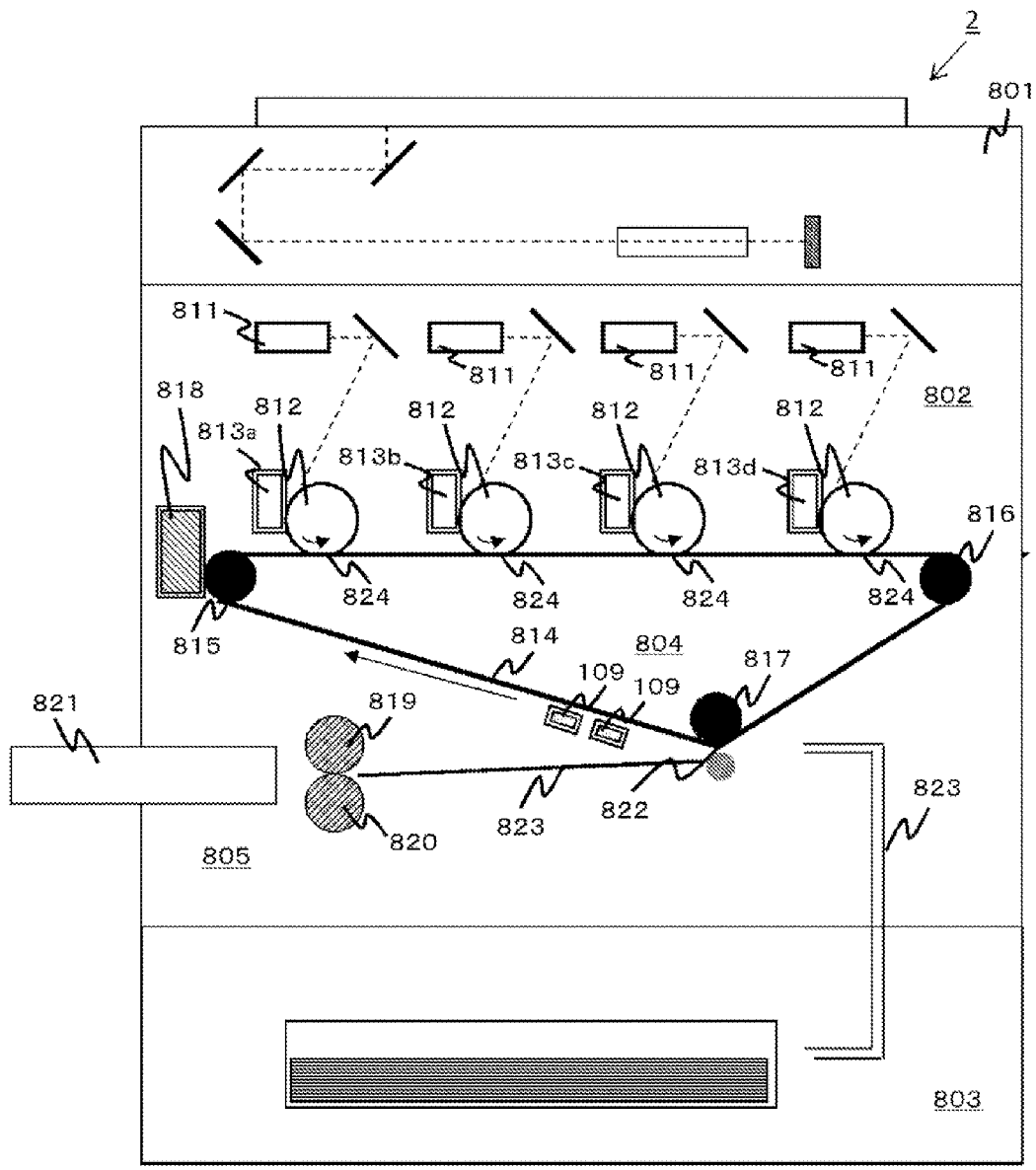
FIG. 8 is a configuration diagram of an image forming apparatus in the present embodiment.

Next, a case where the displacement measuring apparatus 1 is applied to an image forming apparatus will be described. First of all, referring to FIG. 8, a configuration of the image forming apparatus in the present embodiment will be described. FIG. 8 is a configuration diagram of an image forming apparatus 2. The image forming apparatus 2 is roughly configured by including a reader portion 801 that reads an image of a document, an image forming portion 802, a paper feeding unit 803, an intermediate transfer unit 804, and a fixing unit 805.

First of all, the image forming portion 802 of the image forming apparatus 2 will be described. An optical unit 811 exposes a laser beam that is modulated in accordance with image data read by the reader portion 801 onto each corresponding photoreceptor drum 812 so as to form an electrostatic latent image. Each photoreceptor drum 812 is rotationally driven at a constant velocity in a direction indicated by an arrow in the drawing. Developing portions 813a, 813b, 813c, and 813d that contain developers (toners) of four colors of yellow, cyan, magenta, and black, respectively, enable the electrostatic latent image of each photoreceptor drum 812 to be visualized by the toners. A toner image on each photoreceptor drum 812 is transferred onto a surface of an intermediate transfer belt 814 in a primary transfer region 824 of the image. The intermediate transfer belt 814 is stretched and hung on a drive roller 815, a steering roller 816, and a secondary transfer roller 817. The drive roller 815 is coupled to a motor (not shown), which conveys the intermediate transfer belt 814 by the rotation of the motor in a direction indicated by an arrow in the drawing. In a transfer state of the intermediate transfer belt 814, the steering roller 816 tilts the belt tilting toward a direction vertical to a conveying direction (a vertical direction) toward the vertical direction so as to return to its original position.

Subsequently, the intermediate transfer unit 804 will be described. A material of the intermediate transfer belt 814 is polyimide, and the periodic structure scale is formed on a part (an edge portion) of the intermediate transfer belt 814 (the structure) by using the laser processing. The two sensors 109 are disposed so as to face the periodic structure scale. The drive control is performed so that the velocity of the intermediate transfer belt 814 with respect to each photoreceptor drum 812 is the constant velocity in the primary transfer region 824 of the image. A method of performing the drive control will be described below. Thus, a toner image transferred on the intermediate transfer belt 814 is transferred on a sheet that is supplied from the paper feeding unit 803 via a conveying guide 823 in the secondary transfer region 822. The toner remaining on the surface of the intermediate transfer belt 814 is cleaned by a cleaning portion 818.

Subsequently, the fixing unit 805 will be described. The sheet conveyed from the secondary transfer region 822 by the conveying guide 823 fixes the toner image to the sheet in the fixing unit 805. Specifically, using a fixing roller 819 including a heat source and a pressure roller 820 that is pressed on the fixing roller 819, a fixing process is performed for the sheet. The sheet for which the fixing process has been performed is ejected to a paper ejection tray 821.

Figure 9:
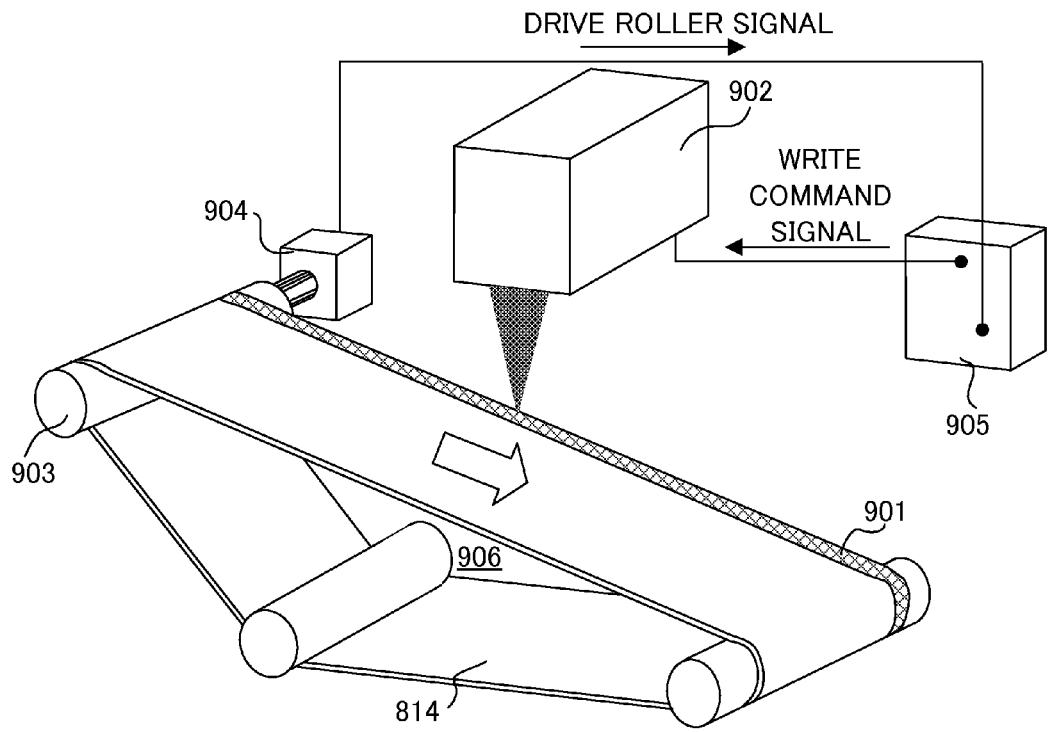
FIG. 9 is a configuration diagram of a processing apparatus that processes the periodic structure scale on an intermediate transfer belt in the image forming apparatus of the present embodiment.

Next, referring to FIG. 9, a method of processing the periodic structure scale on the intermediate transfer belt 814 (the structure) will be described. FIG. 9 is a configuration diagram of a processing apparatus that processes the periodic structure scale on the intermediate transfer belt 814. The intermediate transfer belt 814 is processed at the manufacturing time so that the edge portion 901 of the surface has a surface nature that is close to a mirror surface. The method is that a mirror surface processing is performed on a part corresponding to the edge portion of the belt that is a molded surface for a mold to perform a molding of the intermediate transfer belt 814 so that the edge portion has the surface nature that is close to the mirror surface at the molding time. Alternatively, for the molded transfer intermediate belt 814, the mirror surface nature may be transferred to the edge portion of the intermediate transfer belt 814 by using a thermal imprint as a secondary processing. For the intermediate transfer belt 814 having the edge portion that is a smooth surface that has been manufactured like this, the periodic structure scale including the convex portion, the curved concave portion, and the plane portion is formed on the smooth surface by using a laser processing apparatus 902.

Specifically, the intermediate transfer belt 814 is stretched and hung on a belt conveying apparatus 906 that is exclusively used for the process like the intermediate transfer unit 804. A scale processing control apparatus 905 detects displacement information of the intermediate transfer belt 814 at a process position based on rotation amount information (a drive roller signal) of a drive motor 904 coupled to a drive roller 903. The scale processing control apparatus 905 outputs a write command signal to the laser processing apparatus 902 at a predetermined timing in synchronization with a displacement of the intermediate transfer belt 814. The laser processing apparatus 902 illuminates a line having a predetermined length on the smooth surface of the edge portion 901 by a beam scanning. Thus, the periodic structure scale of the present embodiment can be periodically formed on the smooth surface of the edge portion 901 of the intermediate transfer belt 814.

Figure 10:
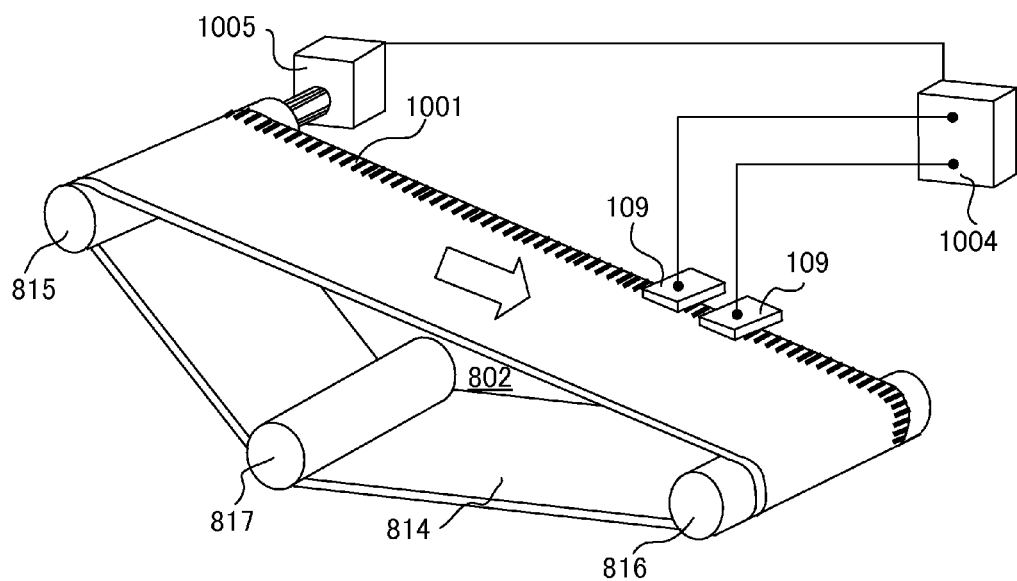
FIG. 10 is a configuration diagram of a sensor that detects a surface velocity of the intermediate transfer belt in the image forming apparatus of the present embodiment.

Next, referring to FIG. 10, a method of performing the drive control of the intermediate transfer belt 814 will be described. FIG. 10 is a configuration diagram of the sensors that detect a surface velocity of the intermediate transfer belt 814. The two sensors 109 disposed at a distance of a predetermined interval from each other are attached so as to face the periodic structure scale that is formed on the surface of the intermediate transfer belt 814. A motor rotation controller 1004 obtains the surface velocity of the intermediate transfer belt 814 based on a displacement pulse signal that is detected by each sensor 109. The motor rotation controller 1004 outputs a rotation command signal to a drive motor 1005 based on the obtained surface velocity of the intermediate transfer belt 814. The drive motor 1005 is rotationally driven so that the surface velocity of the intermediate transfer belt 814 is a desired constant velocity. In FIG. 10, the arrangement of the two sensors 109 is different from those in FIG. 8, but the sensors 109 may be arranged at any positions and therefore the arrangement of the sensors is not limited to them.

Figure 11A:
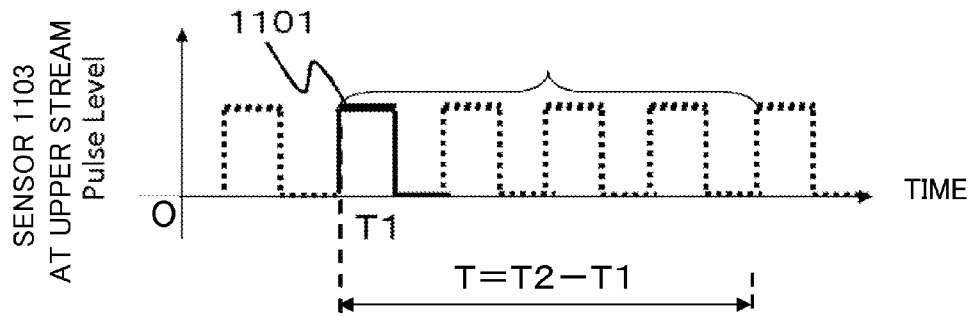
FIGS. 11A to 11C are diagrams of describing a method of detecting the surface velocity of the intermediate transfer belt in the image forming apparatus of the present embodiment.
Figure 11B:
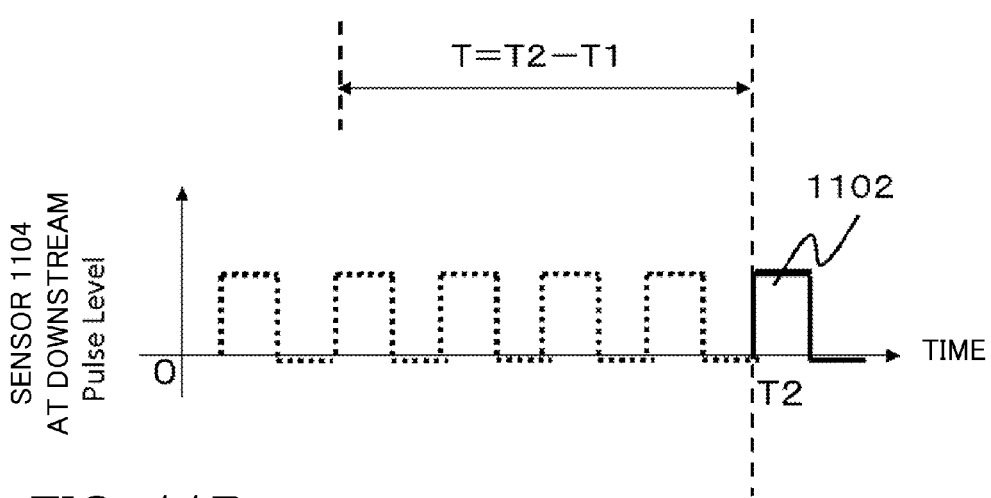
Figure 11C:
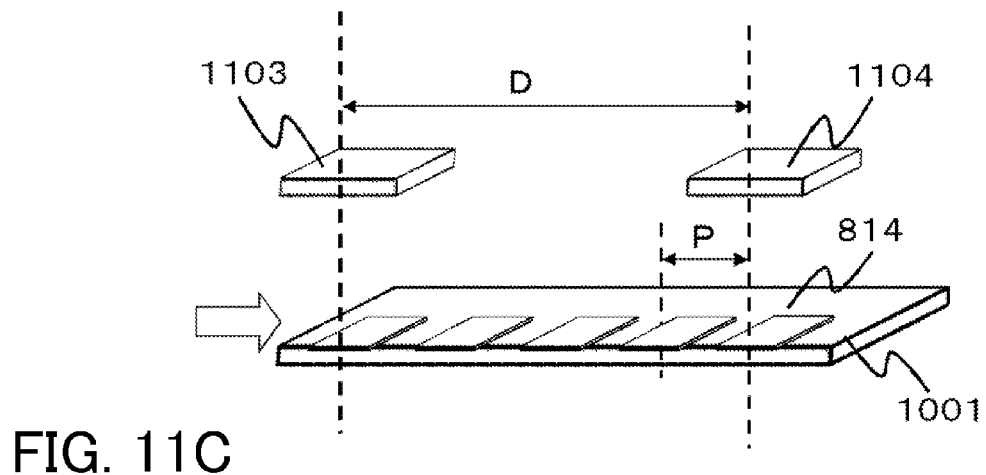

Next, referring to FIGS. 11A to 11C, a method of detecting the surface velocity of the intermediate transfer belt 814 will be described. First of all, a displacement pulse signal that is detected by the sensor 109 will be described. FIGS. 11A and 11B are diagrams of describing the displacement pulse signal that is outputted from the sensor 109. The two sensors 109 detect the displacement pulse signal based on a reflection image from the periodic structure scale 1001 in accordance with the rotational drive of the intermediate transfer belt 814.

Next, a method of detecting the velocity of the structure 101 based on the displacement pulse signal will be described. FIG. 11C is a diagram of illustrating a position relation of two sensors 1103 and 1104 having the same configuration as those of the sensors 109 with respect to the periodic structure scale 1001. The two sensors 1103 and 1104 are disposed at a remove of an interval D each other. In the embodiment, a specific mark on the periodic structure scale 1001 will be considered. This specific mark moves along with the drive of the intermediate transfer belt 814, and first of all, the specific mark is detected by the sensor 1103 disposed at an upper stream with respect to a driving direction of the intermediate transfer belt 814 so as to output a detection pulse 1101 to determine a time T1. Furthermore, based on the drive of the intermediate transfer belt 814, the specific mark is detected by the sensor 1104 disposed at a downstream with respect to the driving direction of the intermediate transfer belt 814 so as to output a detection pulse 1102 to determine a time T2. Then, based on a time difference T (=T2−T1) of detecting the specific mark between these two sensors 1103 and 1104 and the interval D of the two sensors 1103 and 1104, a velocity V at which the intermediate transfer belt 814 passes between the two sensors 1103 and 1104 is obtained using the following Expression (26).

$$V = \frac{D}{T2 - T1} \quad (26)$$

Applying this method of detecting the velocity to an arbitrary mark, the velocity can be detected with a mark period on the periodic structure scale 1001.

There are various kinds of methods as a method of specifying the same mark using the sensors 1103 and 1104 (the upper stream sensor and the downstream sensor), and for example the following method can be considered. A special reference scale pattern that can be identified is previously made on the periodic structure scale 1001 (not shown). Each of the sensors detects the passage of a reflection pattern image from the reference scale pattern, and in this time the detected mark is recognized as a first mark. Then, for each of detected marks, a sequential number is allocated in order. The allocation of the number is independently performed for the two sensors. Thus, the two sensors can specify the same mark based on the number allocated to the mark.

Thus, forming the periodic structure scale on the surface of the intermediate transfer belt 814 made of a polymer material, the surface velocity of the intermediate transfer belt 814 can be controlled so as to be constant. In many cases, the surface of the intermediate transfer belt 814 has a black color, and a surface reflectance is low. Therefore, according to applying the periodic structure scale of the present embodiment, a good displacement signal or velocity signal can be obtained. In addition, according to the image forming apparatus of the present embodiment, a relative color shift of each color toner that is transferred onto the surface of the intermediate transfer belt 814 is reduced and therefore a high-quality image formation can be performed.

According to the present embodiment, increasing an effective reflection region of the periodic structure scale, the signal amplitude is improved and an error output of the pulse is suppressed, and therefore position detection accuracy can be improved. According to the present embodiment, a displacement measuring apparatus and an apparatus (an image forming apparatus) that are capable of performing a highly-accurate measurement even when a reflectance of a structure is low can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

In the present embodiment, the reflection portion 105 is configured by including the curved concave portion 105a and the plane portion 105b, but the embodiment is not limited to this. For example, even when the reflection portion 105 is configured only by the curved concave portion 105a, i.e. the reflection portion 105 does not include the plane portion 105b, the same effect as that of the present embodiment can be obtained.

This application claims the benefit of Japanese Patent Application No. 2012-061463, filed on Mar. 19, 2012, which is hereby incorporated by reference herein in its entirety.

What is claimed is:

1. A displacement measuring apparatus comprising:
a light source configured to illuminate light; and
a photodetector configured to detect reflected light from a reflection portion of a scale that is provided on a structure and alternately and periodically includes a convex portion scattering the light from the light source and the reflection portion reflecting the light,
wherein the displacement measuring apparatus measures a relative displacement between the structure and the photodetector based on a detection result from the photodetector, wherein a length of the reflection portion in a period direction of the scale is greater than a half of a sum of lengths of the convex portion and the reflection portion, and wherein the reflection portion includes a flat portion that reflects the light from the light source, and a curved concave portion that is formed at both ends of the flat portion in the period direction of the scale and that reflects and collects the light illuminated from the light source, wherein following expressions are satisfied:

$$\frac{P}{2} < F + C < P$$

$$0 < S < \frac{P}{2}$$

$$0 < F < \frac{P-S}{2} + \frac{d}{2} \times \frac{L1}{L1+L2}$$

where P is a period of the scale, F is a length of the flat portion in the period direction in one period of the scale, C is a length of the curved concave portion in the period direction in one period of the scale, S is a length of the convex portion in the period direction in one period of the scale, d is a length of a light receiving element of the photodetector in the period direction, L1 is an optical path length from the light source to a light reflection position on the scale, and L2 is an optical path length from the light reflection position to a light incident position on the light receiving element.

2. The displacement measuring apparatus according to claim 1, wherein following expression is satisfied:

$$\sqrt{-\left(\frac{F}{2}\right)^2 + \left(\frac{2 \times L1 \times L2 \times (F+C)}{(F+C) \times L2 + (F+C-d) \times L1}\right)^2} -$$
$$\sqrt{-\left(\frac{F+C}{2}\right)^2 + \left(\frac{2 \times L1 \times L2 \times (F+C)}{(F+C) \times L2 + (F+C-d) \times L1}\right)^2} \le H <$$
$$\frac{2 \times L1 \times L2 \times P}{P \times L2 + (d+P) \times L1} - \sqrt{-\left(\frac{P}{2}\right)^2 + \left(\frac{2 \times L1 \times L2 \times P}{P \times L2 + (d+P) \times L1}\right)^2}$$

where H is a height of the convex portion.

3. The displacement measuring apparatus according to claim 1, wherein following expression is satisfied:

$$R = \frac{2 \times L1 \times L2}{L1 + L2}$$

where R is a radius of curvature of the curved concave portion.

4. The displacement measuring apparatus according to claim 1, wherein the scale is formed by a thermal process.

5. The displacement measuring apparatus according to claim 1, wherein the scale is made of a polymer material.

6. The displacement measuring apparatus according to claim 1,
wherein the scale is processed by a laser, and
wherein a beam diameter of the laser is not more than a half of a period of the scale.

7. The displacement measuring apparatus according to claim 1,
wherein a top of the convex portion is configured to scatter the light from the light source, and
wherein the convex portion and the reflection portion of the scale are made of the same material.

8. An apparatus comprising:
a light source;
a structure capable of being displaced, including a scale in which a convex portion scattering light from the light source and a reflection portion reflecting the light are alternately and periodically arranged; and
a photodetector configured to detect reflected light from the reflection portion,
wherein a length of the reflection portion in a period direction of the scale is greater than a half of a sum of lengths of the convex portion and the reflection portion, and
wherein the reflection portion includes a flat portion that reflects the light from the light source, and a curved concave portion that is formed at both ends of the flat portion in the period direction of the scale and that reflects and collects the light illuminated from the light source,
wherein following expressions are satisfied:

$$\frac{P}{2} < F + C < P$$

$$0 < S < \frac{P}{2}$$

$$0 < F < \frac{P-S}{2} + \frac{d}{2} \times \frac{L1}{L1+L2}$$

where P is a period of the scale, F is a length of the flat portion in the period direction in one period of the scale, C is a length of the curved concave portion in the period direction in one period of the scale, S is a length of the convex portion in the period direction in one period of the scale, d is a length of a light receiving element of the photodetector in the period direction, L1 is an optical path length from the light source to a light reflection position on the scale, and L2 is an optical path length from the light reflection position to a light incident position on the light receiving element.

9. The apparatus according to claim 8, wherein the apparatus is an image forming apparatus and the structure is a transfer belt.

10. The apparatus according to claim 8,
wherein a top of the convex portion is configured to scatter the light from the light source, and
wherein the convex portion and the reflection portion of the scale are made of the same material.

* * * * *